United States Patent [19]

Iseler et al.

[11] Patent Number: 4,941,937
[45] Date of Patent: Jul. 17, 1990

[54] METHOD FOR BONDING REINFORCEMENT MEMBERS TO FRP PANELS

[75] Inventors: Kenneth A. Iseler, Richmond; Robert E. Wilkinson, Birmingham, both of Mich.

[73] Assignee: The Budd Company, Troy, Mich.

[21] Appl. No.: 187,359

[22] Filed: Apr. 28, 1988

[51] Int. Cl.⁵ .................. B32B 31/20; B32B 31/28
[52] U.S. Cl. ................... 156/274.8; 156/272.4; 156/273.7; 156/275.3; 156/275.5; 156/291; 156/292; 156/307.3
[58] Field of Search ........ 156/292, 274.8, 290, 156/315, 272.2, 272.4, 274.4, 274.6, 275.5, 285, 380.2, 380.3, 380.5, 380.6, 380.8, 275.3, 275.1, 291, 196, 228, 307.3

[56] References Cited

U.S. PATENT DOCUMENTS

| | | |
|---|---|---|
| 2,393,541 | 1/1946 | Kohler .............................. 156/275.5 |
| 2,407,833 | 9/1946 | Jablonsky . |
| 2,467,782 | 4/1949 | Schuman . |
| 2,539,375 | 1/1951 | Snyder . |
| 2,610,288 | 9/1952 | Cage . |
| 2,678,897 | 5/1954 | Mann et al. . |
| 2,694,027 | 11/1954 | Calkins . |
| 2,700,634 | 1/1955 | Ackerlind . |
| 2,705,993 | 4/1955 | Mann et al. . |
| 2,729,732 | 1/1956 | Mogilner . |
| 2,774,700 | 12/1956 | Killington . |
| 2,820,875 | 1/1958 | Werych et al. . |
| 3,232,810 | 2/1966 | Reesen . |
| 3,388,945 | 6/1968 | Kevelin et al. . |
| 3,437,776 | 4/1969 | Schaeffer .......................... 156/274.4 |
| 3,454,442 | 7/1969 | Heller . |
| 3,468,736 | 9/1969 | Porter et al. . |
| 3,518,396 | 6/1970 | Wilson et al. . |
| 3,535,184 | 10/1970 | Schwartz . |
| 3,620,875 | 11/1971 | Guglielmo, Sr. et al. . |
| 3,669,821 | 6/1972 | Sharp ................................ 156/292 |
| 3,730,812 | 5/1973 | Prisk et al. . |
| 3,783,217 | 1/1974 | Brown . |
| 3,888,715 | 6/1975 | Fraser et al. . |
| 4,013,860 | 3/1977 | Hosterman et al. . |
| 4,092,193 | 5/1978 | Brooks . |
| 4,201,614 | 5/1980 | Barker et al. . |
| 4,293,363 | 10/1981 | Wakabayashi et al. . |
| 4,383,060 | 5/1983 | Dearlove ........................... 524/919 |
| 4,414,052 | 11/1983 | Habata et al. . |
| 4,423,191 | 12/1983 | Haven et al. . |
| 4,462,946 | 7/1984 | Goldsworthy . |
| 4,528,057 | 7/1985 | Challenger et al. . |
| 4,544,432 | 10/1985 | Foister ............................... 156/315 |
| 4,568,405 | 2/1986 | Lin ..................................... 156/275.5 |

Primary Examiner—Merrell C. Cashion, Jr.
Attorney, Agent, or Firm—Harness, Dickey & Pierce

[57] ABSTRACT

A method and apparatus is disclosed for bonding fiber reinforced plastic exterior automotive body panels to reinforcement members using dielectric heating.

13 Claims, 2 Drawing Sheets

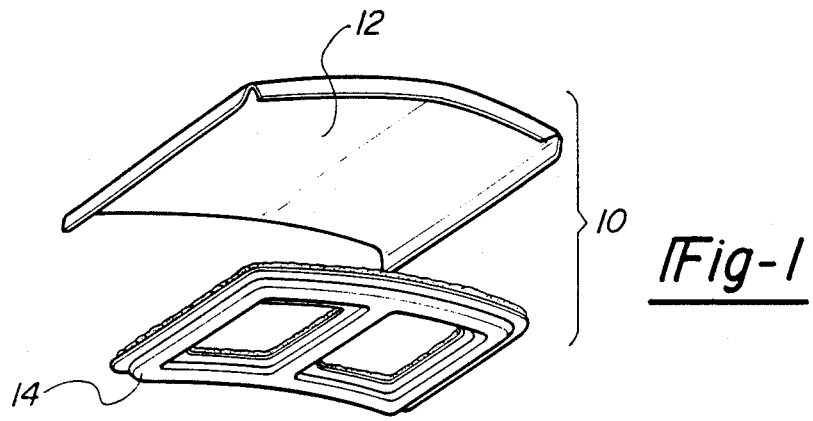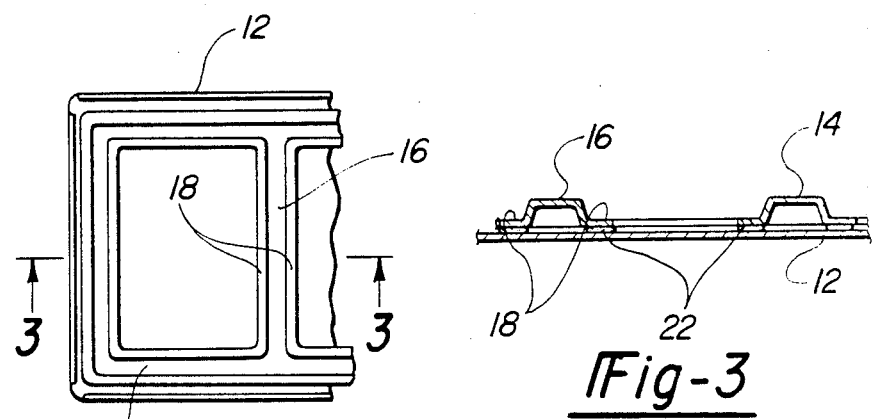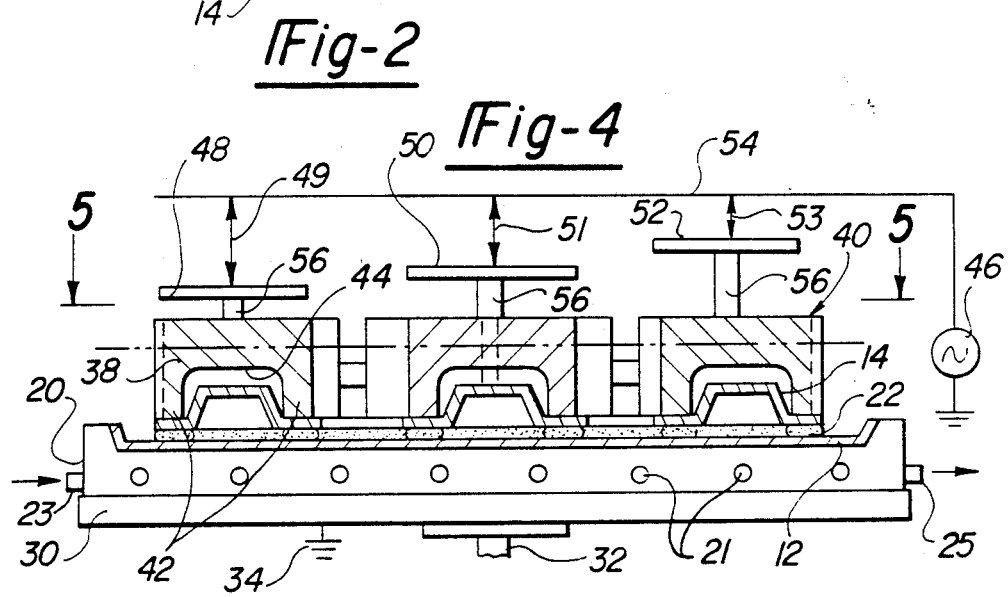

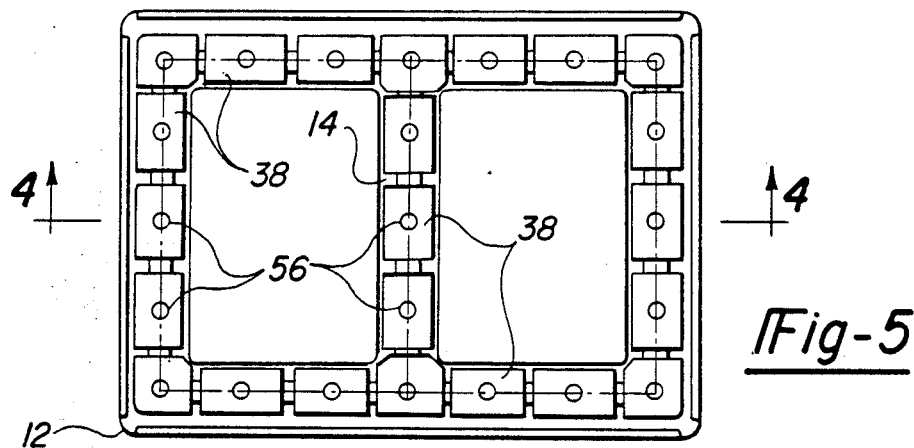
*Fig-5*
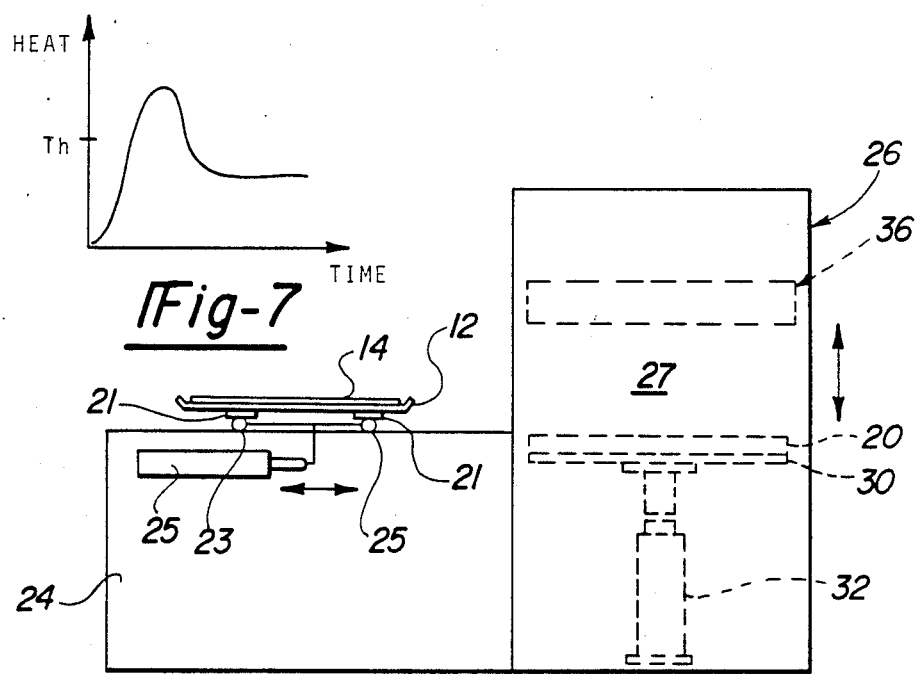
*Fig-7*
*Fig-6*

METHOD FOR BONDING REINFORCEMENT MEMBERS TO FRP PANELS

1. TECHNICAL FIELD

This invention relates to bonding techniques and, more particularly, to methods and apparatus for bonding automotive fiber reinforced plastic (FRP) body members together.

2. DISCUSSION

The recent trend in vehicle design is to replace heavier metal parts with plastic parts. In particular, many advantages can result from using fiber reinforced plastic (FRP) exterior automotive body assemblies such as hoods, decks, doors and the like instead of their sheet metal counterparts. However, it is often necessary to reinforce larger exterior FRP panels or members with a reinforcement member in order to provide the resulting assembly with sufficient rigidity and mechanical strength.

The present invention is particularly directed to techniques for expeditiously bonding a reinforcement member to an exterior FRP member in a manner that will not unduly adversely affect the surface qualities of the exterior member.

SUMMARY OF THE INVENTION

In accordance with the teachings of the preferred embodiment, an adhesive is placed between mating surfaces of a fiber reinforced plastic member and an associated reinforcement member therefor. A high frequency signal is applied to electrodes on either side of the assembly which heats the adhesive to above its curing temperature to thereby bond the reinforcement member to the fiber reinforced plastic member. It has unexpectedly been found that this technique does not generate excessive heat which could otherwise create surface imperfections in the FRP member.

Accordingly, a principal object of the present invention is to provide a bonding method and apparatus capable of being used to expeditiously adhere a reinforcement member to an exterior fiber reinforced plastic body member.

Another object of the present invention is to provide such a bonding method and apparatus which will not adversely affect the surface qualities of the exterior fiber reinforced plastic body member.

A further object of the present invention is to provide such a bonding method and apparatus which is capable of providing even bonding of the reinforcement member to the exterior fiber reinforced plastic body member notwithstanding the size of the body member and the reinforcement member.

BRIEF DESCRIPTION OF THE DRAWINGS

The various advantages of the present invention will become apparent to one skilled in the art upon a study of the following detailed description of one preferred embodiment with reference to the drawings in which:

FIG. 1 is an exploded perspective view of an assembly comprising an exterior automotive body member and a reinforcement member therefor;

FIG. 2 is a partial bottom plan view of the assembly of FIG. 1;

FIG. 3 is a partial sectional view of the assembly of FIG. 1 taken along lines 3—3 of FIG. 2;

FIG. 4 is a cross-sectional view taken along lines 4—4 of FIG. 5, which illustrates in simplified form apparatus for carrying out the preferred method of this invention;

FIG. 5 is a cross-sectional view taken along lines 5—5 of FIG. 4;

FIG. 6 is a front view of the apparatus of FIGS. 4 and 5; and

FIG. 7 is a graph illustrating the relationship between time and heat generated during the bonding process.

DESCRIPTION OF THE PREFERRED EMBODIMENT

The present invention is particularly concerned with providing reinforced exterior automotive body assemblies such as hoods, doors and bumper assemblies. The invention provides an expeditious method for bonding a first, typically exterior, fiber reinforced plastic member and a second reinforcing member, which is also preferably manufactured of a fiber reinforced plastic, although other plastic materials or even metal may be used. In certain cases, such as the bumper assembly, the first and second members are more appropriately described as mutually reinforcing since the second member may actually define part of the exterior surface of the automotive assembly, e.g., to locate automobile features such as signal lights or head lights.

The invention is described in detail below with reference to the manufacture of an automotive hood assembly, however, it will be appreciated by those skilled in the art that the present invention, as defined by the appended claims, is clearly not limited to this particular application.

A hood assembly, generally designated by the numeral 10, is illustrated in the drawings. Assembly 10 consists of a relatively thin (about 0.080 to 0.120 inch thick) outer skin member 12 and a reinforcement member 14. Outer skin member 12 is constructed of fiber reinforced plastic (FRP) and is preferably made from thermosetting sheet molding compound (SMC) material which has been compression molded under vacuum. U.S. Pat. Nos. 4,488,862; 4,551,085; and 4,612,149 owned by The Budd Company of Troy, Mich., relate to such techniques and are hereby incorporated herein by reference.

The present invention finds particular utility when member 12 is an automotive exterior body panel such as a hood, deck, or the like which has a relatively large surface area exceeding about one square foot and having a length in at least one dimension of 47 inches. These types of panels usually require reinforcement in order to provide them with sufficient mechanical rigidity and it is important to maintain the smooth aesthetically pleasing outer surface of the skin typically required by the automobile manufacturers. This standard is generally referred to in the industry as a class A surface. By way of a nonlimiting specific example, assembly 10 is a hood for a Ford Aerostar minivan and its outer dimensions are approximately 56 inches by 22 inches and is about 0.19 inch thick (0.09 inch for the reinforcement member plus 0.10 inch for the skin).

Preferably, reinforcement member 14 is likewise constructed of FRP material. In the embodiment illustrated, member 14 is configured into a "figure 8" design in plan view and each leg is formed of a "hat" design in cross section as can be seen most clearly in FIGS. 3 and 4. The hat cross section is characterized by a raised dome portion 16 and a pair of oppositely directed flanges 18.

To bond the reinforcement member 14 to the skin member 12, a bead of adhesive 22 is laid on the flanges 18, with the reinforcement member 14 then being turned over and laid onto the interior surface of the skin 12 as shown in FIGS. 3–6. The adhesive 22 is a thermosetting resin that exhibits a change in dielectric properties when cured. The adhesive bead preferably contains a resin consisting of uncrossedlinked polymers and monomers, with a second part consisting of a hardener or catalyst. Epoxy resin adhesives are presently preferred although polyurethanes should prove to be acceptable. These adhesives are to be distinguished from glues such as animal glues which do not rely upon a chemical change to effect their adhesive qualities. As will appear clear from the following discussion, the present invention utilizes this characteristic of certain adhesives to great advantage. By way of specific, but nonlimiting example, adhesive 22 is a Lord 320/322 epoxy adhesive available from Lord Corporation.

Referring to FIG. 6, the skin/adhesive/reinforcement member assembly is then moved into a chamber 27 of a dielectric heater 26. This can be accomplished in a variety of manners. In this embodiment, the assembly is laid on a plurality of fingers 21 which contact the outer edges of the underneath surface of the skin 12. Fingers 21 ride on rollers 23 to form a trolley which carries the assembly rightwardly in FIG. 6 by way of a piston arrangement 25. The assembly is carried into the chamber 27 of the dielectric heater 26 to a position wherein the skin 12 is supported above nest 20. As can be seen most clearly in FIG. 4, the upper suface of nest 20 is contoured so that it corresponds to the contour of the exterior or class A surface of skin 12 to provide it with uniform support during the bonding process. Nest 20 should be made of material which exhibits low dielectric loss characteristics. In this example, nest 20 is made of aluminum but other materials such as brass could also be used. A cooling medium is circulated through a conduit 21 from inlet 23 to outlet 25 for maintaining the exterior surface of skin 12 at a constant temperature of 40°–150° F. throughout the bonding process.

The nest 20 is attached to an electrically grounded 34 electrode plate 30. The nest 20 and electrode plate 30 subassembly is driven by a hydraulic piston 32. After the skin/adhesive/reinforcement member assembly has been located above nest 20, hydraulic piston 32 is actuated to cause the nest to rise upwardly and lift the assembly from its supporting fingers 21 thereby depositing the skin 12 in the nest 20. Piston 32 continues to carry the nest 20 upwardly to an upper electrode assembly generally designated by the numeral 36.

Electrode assembly 36 includes a series of segmented or electrically isolated concentrator members 38 held together in a fixed position by a frame 40 (see FIGS. 4 and 5). Concentrator members 38 each have a generally U-shaped lower section having a pair of depending legs 42. Legs 42 are configured so that they generally correspond to the flanges 18 of reinforcement member 14 as shown most clearly in FIG. 4. Recess 44 provides clearance for raised dome 16 of reinforcement member 14. Concentrator members 38 serve to concentrate energy from a high frequency voltage source 46 in selected areas containing the adhesive 22.

Electrode assembly 36 further includes a plurality of electrode plates 48 which generally overly the concentrator members 38. In FIG. 4 there are three such plates 48, 50 and 52 shown. However, it should be understood that in practice that many more such plates are employed, e.g., see FIG. 5. Plates 48, 50 and 52 are also constructed of electrically conductive material such as aluminum or brass and they are each connected to high frequency voltage source 46 as illustrated by upper electrode 54. Air gaps 49, 51, and 53 exist between electrode 54 and electrode plates 48, 50 and 52, respectively.

Provision is made for adjusting the relative air gaps or spacing between the electrode plates 48, 50, and 52, and upper electrode 54 (and thus the area below the electrode plates, via members 38, to be heated). The spacing between the electrode plates and the upper electrode 54 will affect the amount of energy applied to the material to be heated. In this embodiment, by adjusting the size of air gaps 49, 51 and 53 it is possible to fine tune the amount of heat that is actually generated in the underlying adhesive. Thus, it becomes possible to further ensure that even heating occurs thereby resulting in a uniform bond strength. Independent adjustment of the heat generated under each concentrator member 38 in effect allows for the application of substantially even heat across assembly 10 notwithstanding its size and the inequalities generated thereby. The adjustment can be accomplished in many ways. In FIG. 4, this function is provided by way of a telescoping tube 56 connected between each electrode plate 48, 50 and 52 and its respective concentrator member 38. Depending upon the size of concentrator member 38 and its horizontal area to be heated, more than one electrode plate may be attached thereto via multiple telescoping tubes 56.

Voltage source 46 generates a high frequency electrostatic field between the electrode assembly 36 and the lower electrode plate 30. The applied RMS voltage from source 46 can, for example, be between 300 volts and 8,000 volts. A voltage of less than 300 is disadvantageous because it is believed insufficient to significantly heat adhesive 22. Conversely, an applied value in excess of 8,000 volts is believed disadvantageous because serious electrical insulation problems will begin to occur between electrode plates 48, 50, 52, etc., and ground. Voltage source 46 applies oscillating or alternating current frequencies in the range of between 25 megahertz and 40 megahertz. Frequencies less than 10 megahertz are believed disadvantageous because voltages required to heat the adhesive 22 are too large to achieve an identical heating time and there is a greater probability of arcing occuring. Frequencies in excess of 110 megahertz are believed disadvantageous because the number of required individual electrode plates 48, 50 and 52 becomes excessively large, compounding the difficulty of obtaining an even heating of the adhesive. Further, coupling between concentrator members 38 becomes more pronounced with frequencies above 110 megahertz, thereby making adjustments of individual electrode plates 48, 50 and 52 more interrelated. It is believed that the optimum frequency is one that will allow a sufficiently fast heating time with a minimum of arcing in the electrode assembly. Also, with too high a frequency, it should be noted that it is possible to heat adhesive 22 so fast that the chemical reaction therein can not keep pace with the temperature rise.

The present invention is particularly well suited for high volume production. By way of a nonlimiting example, after the nest 20 has been raised into the position shown in FIG. 4, good bond strength is achieved by applying the electric field at a constant frequency and constant voltage for a period of between 15 and 120 seconds. The term "constant" as used herein refers to the fact that frequency and voltage are not purposely varied during the heating cycle to achieve a significant dual heating rate. It has unexpectedly been found that this process has a built in "fail safe" mechanism that prevents overheating which could destroy the smooth exterior surface of skin 12. With reference to FIG. 7, it is believed that by using a chemically reactive thermosetting adhesive to bond together two previously cured thermosetting FRP parts that the heat generated in the adhesive will be sufficient to bring the adhesive just past its curing temperature (Th) relatively quickly. However, once the adhesive cures, the heat generated therein tends to decrease over time even though the applied field is constant. Although this phenomena is not totally understood, it is believed that it is due to a change in dielectric properties of the adhesive between its cured and uncured states. In this specific example, the voltage source 46 is energized for a period of between 30 to 40 seconds at a frequency of 34 MHz and a voltage of approximately 4400 volts. This provides sufficient time to ensure uniform curing of the adhesive while at the same time is quick enough to provide manufacturing economy. Then, piston 32 is lowered and the bonded assembly is removed from the heater 26.

The above technique is believed to be considerably more advantageous over other methods for bonding reinforcement members to thermosetting SMC skins. Conventional radiant heating methods are generally too slow and result in nonuniform bonds and/or excessive heat generated by the adhesive which can burn and show through the exterior skin. Induction heating generally requires the use of metallic particles in the adhesive or areas to be heated. This is not a practical approach for exterior automotive body panel assemblies. The apparatus of the preferred embodiment is also designed to overcome problems which have been found to be present when attempting to use dielectric heating for bonding relatively large parts. It has been discovered that if a single elongated electrode is used to bond parts exceeding about 47 inches at 34 MHz, uneven heating can unexpectectedly occur. Although the reason for this phenomena is not completely understood, it is believed that the uneven heating is caused because various areas of the elongated electrode will have certain peaks of energy radiating therefrom which may be due to the fact that the electrode length approaches 1/15 of a wavelength of the alternating voltage source 46 (thereby producing heat variations of greater than or equal to 10%). Thus, various voltage rises are created along the length of the two opposing electrodes and can result in uneven heating of the parts. The preferred embodiment of this invention is believed to solve many of these problems and provide the manufacturer with the needed flexibility to fine tune the apparatus to the particular parts being bonded. Still other advantages of the present invention will be apparent to those skilled in the art upon a study of the drawings, specification and claims herein presented.

Although one detailed embodiment of the method and apparatus of this invention has been illustrated in the accompanying drawings and described in the foregoing detailed description, it will be understood that the invention is not limited to the particular embodiments described herein but is capable of numerous rearrangements, modifications and substitutions without departing from the scope of the invention. For example, the method and apparatus may be successively utilized to produce assemblies comprising three or more members, such as an automotive door manufactured of a first, outer fiber reinforced plastic member, a middle metal member, and a second, inner fiber reinforced plastic member. Other changes will suggest themselves to those skilled in the art. The following claims are intended to encompass all such modifications.

What is claimed is:

1. A method of bonding a cured fiber reinforced plastic part to a reinforcement member, said method comprising:
    forming an assembly by placing an uncured thermosetting adhesive between mating surfaces of the part and reinforcement member;
    placing the assembly between two electrodes; and
    applying a high frequency signal having a frequency of between about 10 megahertz to about 110 megahertz at a voltage of between about 300 to about 8000 volts from a dielectric heater to the electrodes for a period of time from about 15 seconds to about 120 seconds which is sufficient to cure the adhesive without adversely affecting the surface qualities of the exterior of the part.

2. The method of claim 1 wherein the part is an exterior automotive body part having a surface area exceeding one square foot and a length in at least one dimension exceeding 47 inches.

3. The method of claim 2 wherein said reinforcement member is generally hat shaped in cross section characterized by a recessed dome and a pair of flanges, with a bead of adhesive being applied between the flanges and the interior surface of the part.

4. The method of claim 1 wherein the adhesive is a two part epoxy adhesive having a resin and a hardener.

5. The method of claim 3 wherein the reinforcement member is made of cured fiber reinforced plastic.

6. The method of claim 1 wherein said high frequency signal has a frequency of 25-40 megahertz.

7. The method of claim 1 which further comprises the step of painting the part after curing the adhesive.

8. The method of claim 1 wherein the part has a surface area exceeding one square foot.

9. The method of claim 1 wherein the adhesive is a two part adhesive comprising a resin and a hardener.

10. The method of claim 1 wherein the part is an exterior body part.

11. A method of bonding to a reinforcement member an exterior automotive body skin having a surface area of at least one square foot and a length in at least one dimension exceeding 47 inches, said method comprising the steps of:
    forming the skin and reinforcement member by compression molding charges of thermosetting sheet molding compound, with the reinforcement member being configured so as to have a hat shaped cross section with a dome and pair of flanges;
    applying a bead of heat curable, two part epoxy adhesive containing a resin and hardener onto the flanges of the reinforcement member;
    placing the reinforcement member onto the skin to form an assembly;
    inserting the assembly between electrodes in a dielectric heater;
    applying an alternating electrical signal having a frequency of between about 10 megahertz to about 110 megahertz at a voltage of between about 300 to about 8000 volts between the electrodes for a period of time from about 15 seconds to about 120 seconds to form a bonded reinforced panel assembly; and removing the reinforced panel assembly from the nest.

12. The method of claim 1 wherein:
said skin is in the shape of a hood.

13. The method of claim 11 wherein the skin is about 0.080 to 0.120 inch thick.

* * * * *